US011967883B2

(12) United States Patent
Botkin et al.

(10) Patent No.: US 11,967,883 B2
(45) Date of Patent: Apr. 23, 2024

(54) CEILING FAN

(71) Applicant: Hunter Fan Company, Memphis, TN (US)

(72) Inventors: Charles William Botkin, Memphis, TN (US); Bobby Neal Norwood, Oakland, TN (US); Douglas Troy Mason, Horn Lake, MS (US)

(73) Assignee: Hunter Fan Company, Memphis, TN (US)

( * ) Notice: Subject to any disclaimer, the term of this patent is extended or adjusted under 35 U.S.C. 154(b) by 9 days.

(21) Appl. No.: 17/737,973

(22) Filed: May 5, 2022

(65) Prior Publication Data
US 2023/0361650 A1 Nov. 9, 2023

(51) Int. Cl.
| | |
|---|---|
| *H02K 7/14* | (2006.01) |
| *F04D 25/08* | (2006.01) |
| *F04D 29/34* | (2006.01) |
| *H02K 1/2786* | (2022.01) |
| *H02K 5/02* | (2006.01) |

(52) U.S. Cl.
CPC ............. *H02K 7/14* (2013.01); *F04D 25/088* (2013.01); *F04D 29/34* (2013.01); *H02K 1/2786* (2013.01); *H02K 5/02* (2013.01)

(58) Field of Classification Search
CPC .......... H02K 7/14; H02K 1/2786; H02K 5/02; F04D 25/088; F04D 29/34
See application file for complete search history.

(56) References Cited

U.S. PATENT DOCUMENTS

| | | | | |
|---|---|---|---|---|
| 5,883,449 A | * | 3/1999 | Mehta | H02K 5/18 |
| | | | | 310/58 |
| 10,215,180 B2 | | 2/2019 | Allen et al. | |
| 10,511,206 B2 | | 12/2019 | Zhang | |
| 11,041,498 B2 | | 6/2021 | Okuda et al. | |
| 2005/0166630 A1 | * | 8/2005 | Collins | F24F 1/06 |
| | | | | 62/428 |

FOREIGN PATENT DOCUMENTS

DE 102004006933 A1 9/2005

\* cited by examiner

*Primary Examiner* — Christopher M Koehler
*Assistant Examiner* — Riley Owen Stout
(74) *Attorney, Agent, or Firm* — McGarry Bair PC

(57) ABSTRACT

Ceiling fans suspended from a structure have a motor to drive blades for moving a volume of air about an area. The motor, with a rotor and stator, can be electrically coupled to the structure. Blades mount to the rotor such that the blades are rotatably driven by the motor. A motor case can mount to the rotor and encase the stator.

22 Claims, 4 Drawing Sheets

CEILING FAN

BACKGROUND

Ceiling fans are machines typically suspended from a structure for moving a volume of air about an area. The ceiling fan includes a motor, with a rotor and stator, suspended from and electrically coupled to the structure. Blades mount to the rotor such that the blades are rotatably driven by the motor.

BRIEF DESCRIPTION

In one aspect, the disclosure relates to a ceiling fan comprising: a stator comprising a set of circumferentially spaced stator windings, a rotor and comprising a set of rotor laminations circumscribing the stator windings and a rotor cover overcast onto the rotor laminations, with the rotor cover including a set of blade mounts, and a set of blades carried by the set of blade mounts.

In another aspect, the disclosure relates to a ceiling fan comprising: a stator comprising circumferentially spaced stator windings, a rotor and comprising rotor laminations circumscribing the stator windings and a rotor cover formed as an overcasting onto the rotor laminations, except for a portion of the rotor laminations facing the stator windings, with the overcasting including a set of ramps, a plurality of blades, with each of the plurality of blades mounted to a different ramp, a first end bell mounted to an upper end of the rotor cover, a stationary motor shaft extending through the stator and the first end bell, and a bearing mounting the first end bell to the motor shaft.

DETAILED DESCRIPTION

Figure 1:
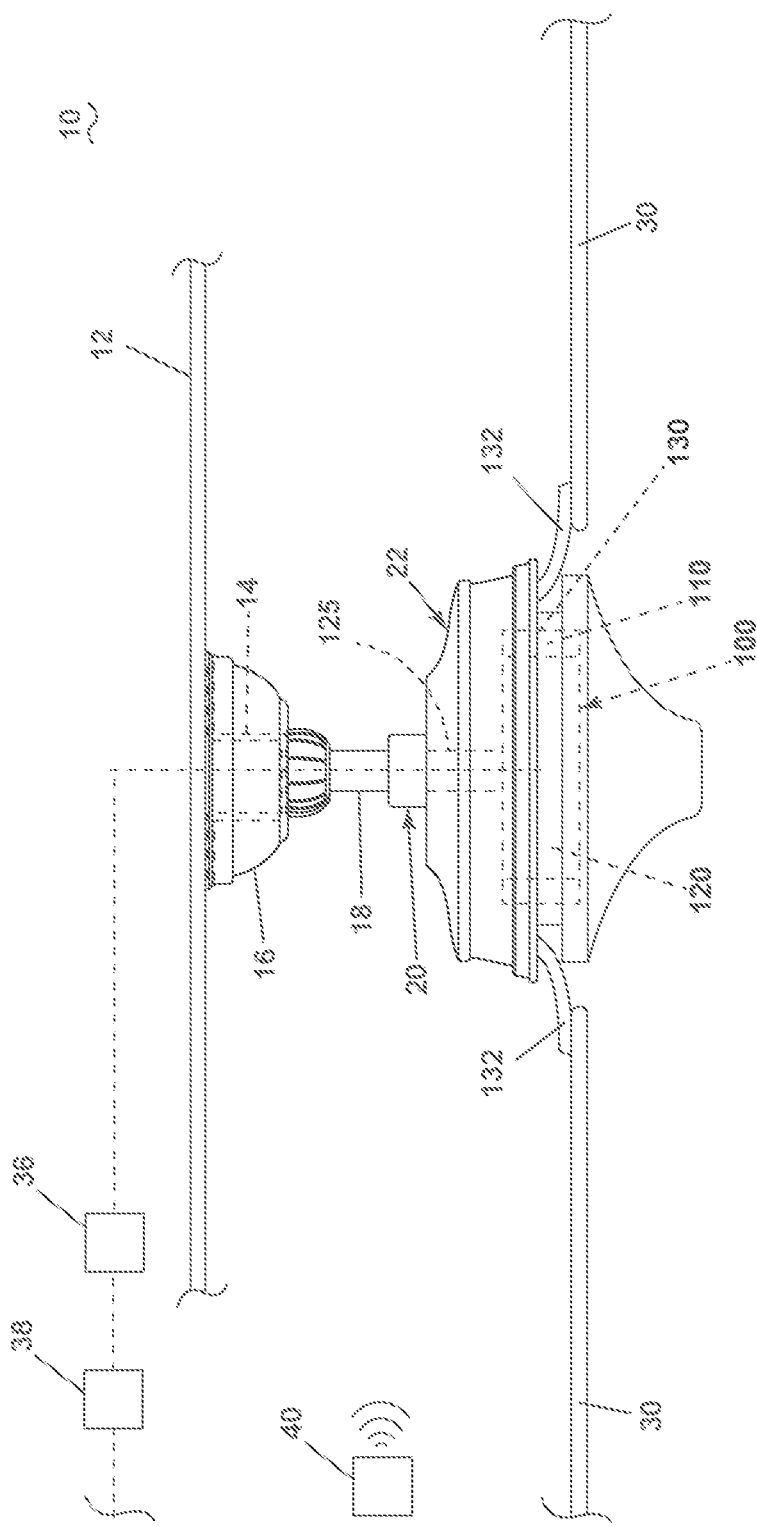
FIG. 1 is a schematic view of a structure with a ceiling fan with a motor assembly suspended from a structure and including a set of blades.

The disclosure is related to a ceiling fan motor assembly and motor cover, which can be used, for example, for ceiling fans or other air moving devices in residential and commercial applications. Such applications can be indoors, outdoors, or both. While this description is primarily directed toward a residential ceiling fan, it is also applicable to any environment utilizing fans or for cooling areas utilizing air movement.

As used herein, the term "set" or a "set" of elements can be any number of elements, including only one. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring now to FIG. 1, a ceiling fan 10 is suspended from a structure 12. In non-limiting examples, the ceiling fan 10 can include one or more ceiling fan components including a hanger bracket 14, canopy 16, a downrod 18, a motor adaptor 20, a motor housing 22, and a set of blades 30. The motor housing 22 can at least partially cover a motor assembly 100 and can serve as an aesthetic cover and to protect the motor assembly 100 from dust and debris. The motor assembly 100 is provided with a rotor 110, a stator 120, a motor shaft 125, and a motor case 130. The motor case 130 encases the rotor 110 and the stator 120, and includes a set of blade mounts 132. The blades 30 can be operably coupled to the motor assembly 100 at the rotor 110 via the blade mounts 132.

In additional non-limiting examples, the ceiling fan 10 can include one or more of a controller, a wireless receiver, a ball mount, a hanger ball, a light kit, a light glass, a light cage, a spindle, a finial, a switch housing, blade forks, blade tips or blade caps, or other ceiling fan components.

The structure 12 can be a ceiling, for example, from which the ceiling fan 10 is suspended. It should be understood that the structure 12 is schematically shown and is by way of example only, and can include any suitable building, structure, home, business, or other environment wherein moving air with a ceiling fan is suitable or desirable. The structure 12 can also include an electrical supply 36 can be provided in the structure 12, and can electrically couple to the ceiling fan 10 to provide electrical power to the ceiling fan 10 and the motor assembly 100 therein. It is also contemplated that the electrical supply be sourced from somewhere other than the structure 12, such as a battery or generator in non-limiting examples.

A controller 38 can be electrically coupled to the electrical supply 36 to control operation of the ceiling fan 10 via the electrical supply 36. Alternatively, the controller 38 can be wirelessly or communicatively coupled to the ceiling fan 10, configured to control operation of the ceiling fan 10 remotely, without a dedicated connection. Non-limiting examples of controls for the ceiling fan 10 can include fan speed, fan direction, or light operation. Furthermore, a separate wireless controller 40, alone or in addition to the wired controller 38, can be communicatively coupled to a controller or a wireless receiver in the ceiling fan 10 to control operation of the ceiling fan 10. It is further contemplated in one alternative example that the ceiling fan be operated by the wireless controller 40 alone, and is not operably coupled with the wired controller 38.

Figure 2:
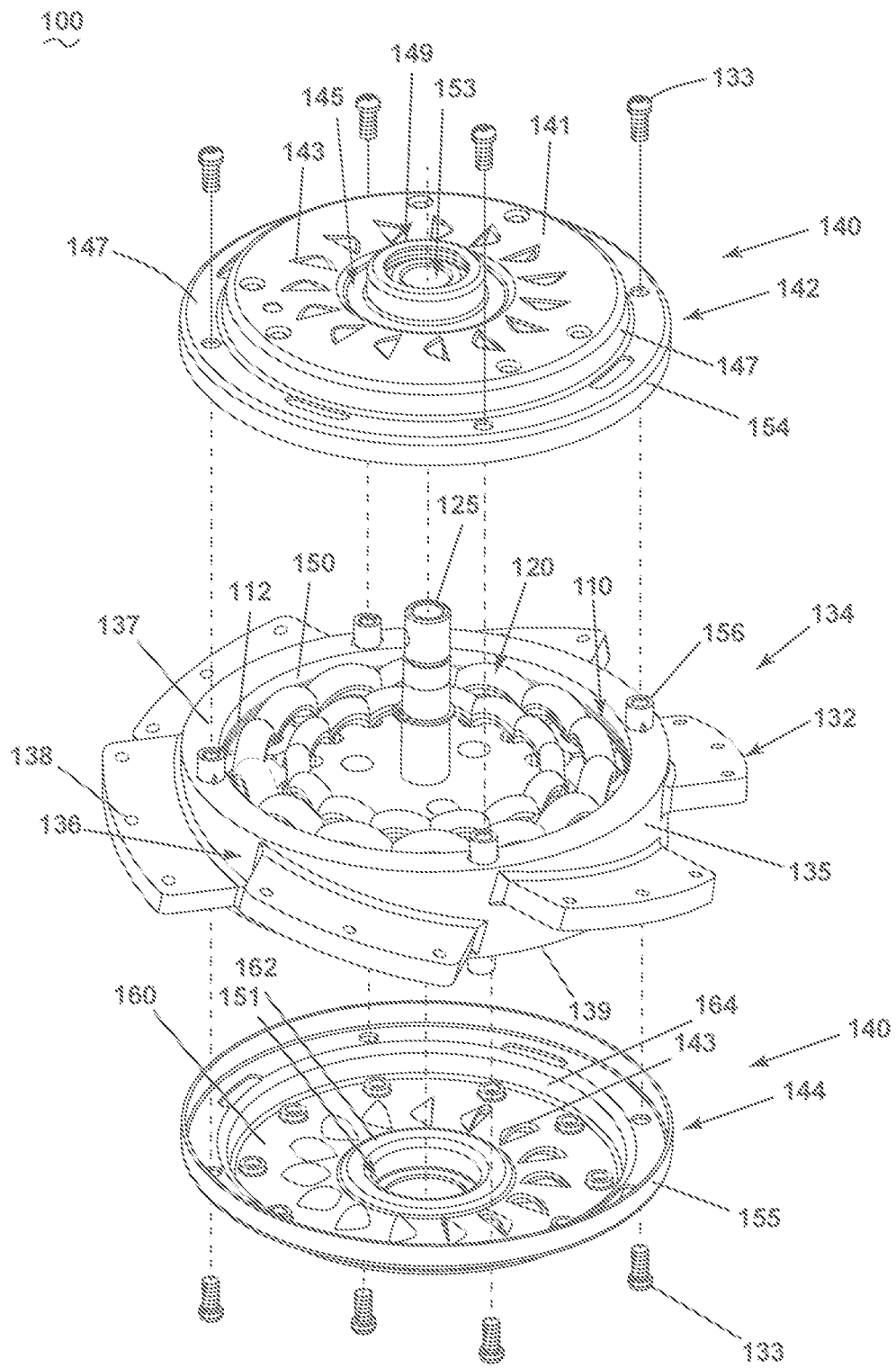
FIG. 2 is a partially exploded view of the motor assembly of FIG. 1.

Referring to FIG. 2, the motor shaft 125 extends centrally through the motor assembly 100. The motor case 130 includes a pair of first and second end bells 140 as an upper cover 142 and a lower cover 144, and further includes a rotor cover 134 spacing the upper cover 142 and the lower cover 144. The motor case 130 can include the blade mounts 132 as part of the rotor cover 134. The end bells 140 extend radially from the motor shaft 125 covering the motor assembly 100. The rotor cover 134 can encase the rotor 110 and circumscribe the stator 120. The end bells 140 mount at the top and bottom of the rotor 110 and the stator 120 to encase the motor assembly 100. The rotor 110 includes laminations 112. The rotor cover 134 is overcast at least partially onto the laminations 112 of the rotor 110. The overcasting material can be, for example, aluminium, but can be any other desired material.

A peripheral wall 136 of the rotor cover 134 includes an upper rim 137 and a lower rim 139. The peripheral wall 136 can include a set of mount posts 156 spaced about the upper rim 137 and the lower rim 139. The set of mount posts 156 can be formed integrally with the peripheral wall 136, while it is contemplated that the posts 156 are non-integral. End bell fasteners 133 can be received by the mount posts 156 to secure the end bells 140 to the peripheral wall 136 at the upper and lower rims 137, 139. The end bell fasteners 133 can include screws or threaded fasteners, in non-limiting examples, while other suitable attachment methods are contemplated.

The rotor cover 134 includes an interior surface 150 facing the stator 120. While the overcasting can cover all of the laminations 112, as illustrated a portion of the laminations 112 are not covered with the overcasting and are exposed at the interior surface 150. The rotor cover 134 includes an exterior surface 135, which defines a radial exterior surface spaced a radial distance from the rotational axis and extends axially between the upper and lower rims 137, 139. A set of blade mounts 132 can be casted with the rotor cover. In one non-limiting example, the set of blade mounts 132 can extend from the exterior surface 135 of the peripheral wall 136. The blade mounts 132 are illustrated as ramps oriented at a slight angle relative to the axis of rotation, but can take on many different forms other than a ramp. Additionally, in non-limiting examples, the blade mounts 132 can have any planar, curved, or angled shape, or combinations thereof, suitable for attaching the blade 30 (FIG. 1). The blade mounts 132 can be arranged on the rotor cover 134 at any angle, which can define the angle of attack for each blade of the set of blades 30. By way of non-limiting example, the angle of attack can be between 5 degrees and 15 degrees, while different or variable angles are contemplated. Blade attachment holes 138 can be provided in the blade mounts 132 to secure the blades 30 to the motor case 130 by any kind of suitable fasteners, such as screws, nails, rivets, grommets, or snap-fit fasteners in non-limiting examples. As the blades 30 can be attached directly to the blade mounts 132, there is no need for an intervening blade iron or bracket to secure the blades 30 to the rotor 110 or rotor cover 134.

Any number of blade mounts can be included in the set of blade mounts 132. In one example, the number and arrangement of blade mounts is such that the blade mounts are circumferentially spaced apart from one another and do not overlap, which simplifies the type of mold used in the overcasting process to a two-part, axial pull mold. Such simplification can reduce manufacturing costs. In another example, members of the set of blade mounts 132 can overlap with one another, which can require a more complex mold for the overcasting, with the mold having both axial pull parts and radial pull parts.

The upper cover 142 includes a main face 141, which extends radially about the motor shaft 125 and covers the top of the motor assembly 100 when assembled. Centrally located in the main face 141 is a first bearing housing 149 surrounding an opening 153 for the motor shaft 125. A set of vent openings 143 are provided in the main face 141. The upper cover 142 further includes a first valley 145 provided between the main face 141 and the first bearing housing 149.

A rim 157 is provided about the main face 141, and is spaced from the main face 141 by an upper sidewall 147. Opposite of the upper sidewall 147 for the rim 157 is a first lip 154. The first lip 154 can be formed, for example, as a lip or a step or any other reasonable shape that at least partially complements the shape of the upper rim 137. The upper cover 142 can be sized such that the rim 157 aligns with the upper rim 137 of the rotor cover 134, and can fasten to the rotor cover 134 at the mount posts 156. The first lip 154 can be sized complementary to the mount posts 156 such that the first lip 154 hides the mount posts 156 when the upper cover 142 couples to the rotor cover 134.

The lower cover 144 includes a main face 160 extending radially about the motor shaft 125 covering the bottom of the motor assembly 100. The main face 160 includes a second bearing housing 151. The main face 160 can include the set of vent openings 143. The lower cover 144 can further include a second valley 162 provided between the main face 160 and the second bearing housing 151. A second rim 159 is provided about the main face 160, and is spaced from the main face 160 by a lower sidewall 164. A second lip 155 extends from the second rim 159, opposite of the lower sidewall 164. Similar to the first lip 154, the second lip 155 can be formed, for example, as a lip or a step or any other reasonable shape that at least partially complements the shape of the lower rim 139. The lower cover 144 can be sized such that the rim 157 aligns with the lower rim 139 of the rotor cover 134, and can fasten to the rotor cover 134 at the mount posts 156. The second lip 155 can be sized complementary to the mount posts 156 such that the second lip 155 hides the mount posts 156 when the lower cover 144 couples to the rotor cover 134.

The second lip 155 can be formed similar or identical to the first lip 154, having any reasonable shape that complements or conforms to the shape of the lower rim 139 of the rotor cover 134. The lower cover 144 can have a form or shape similar to the upper cover 142, but need not be identical. Such differences could account for different needs at the top and bottom of the motor, such as interfacing with the motor shaft 125 or allowing for clearance for other fan elements such as a switch housing or light kit, in one non-limiting example.

Figure 3:
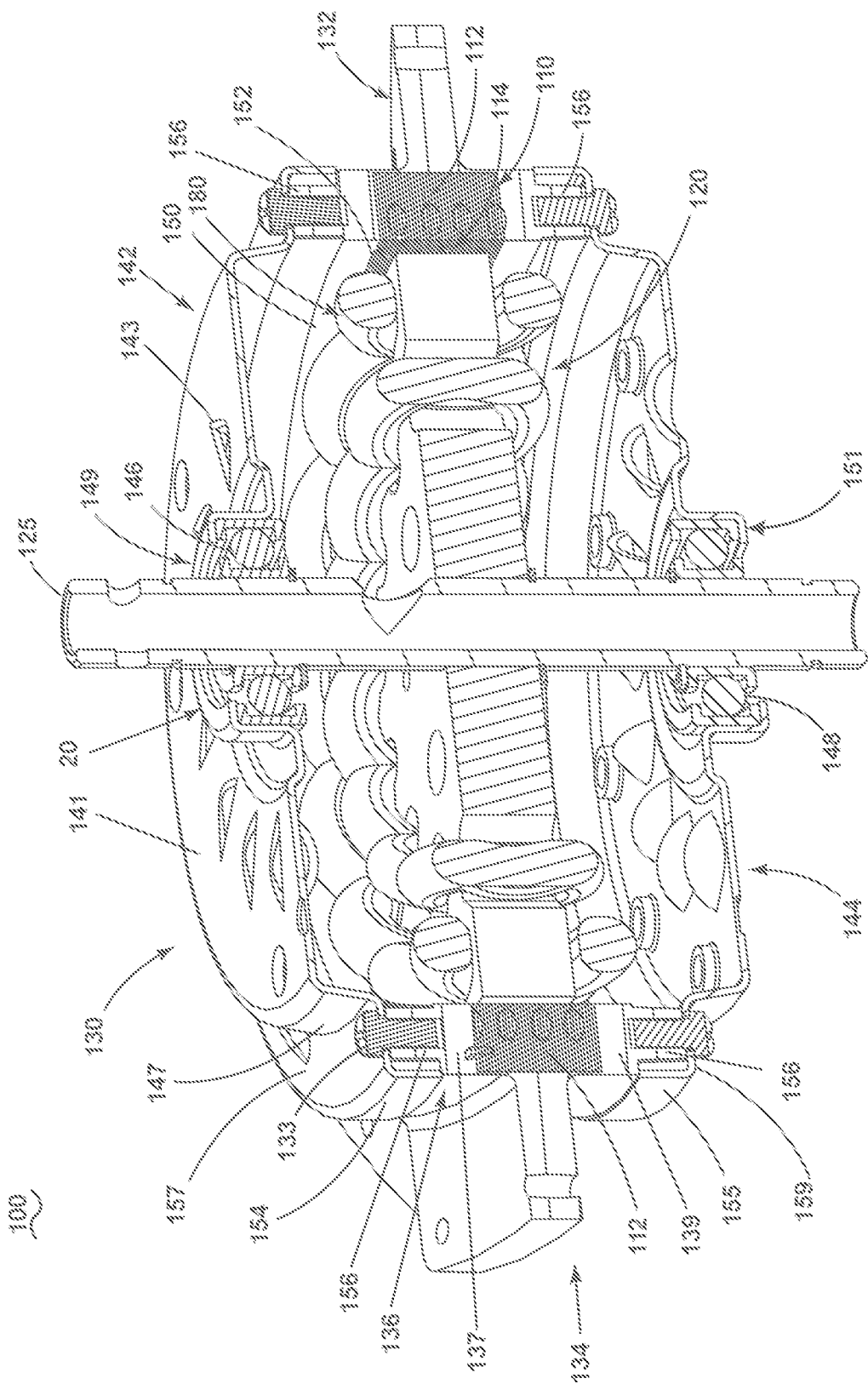
FIG. 3 is a sectional view of the motor assembly of FIG. 2.

Referring to FIG. 3, the motor case 130 is coupled to the rotor 110 by the first bearing housing 149 and the second bearing housing 151 which allows the rotor 110 and the rotor cover 134 to rotate freely about the stator 120. The motor shaft 125 extends centrally and couples to the stator 120, and can define a rotational axis for the rotor 110 and the motor case 130. A first bearing 146 can be provided between the motor shaft 125 and the upper cover 142 at the first bearing housing 149 and a second bearing 148 can be provided between the motor shaft 125 and the lower cover 144 at the second bearing housing 151. The first bearing 146 and the second bearing 148 rotatably couple the motor case 130 to the motor shaft 125, and therefore, rotatably couple the rotor 110 to the motor shaft 125.

The motor assembly 100 can include for example, a single-phase AC induction motor where the stator 120 has start and main windings 180, while other rotor-stator type motors are contemplated. The rotor 110 can be formed of die-cast aluminum, for example. The rotor 110 can further include with a skewed stack of laminations 112 made from steel contained within the die-cast aluminum. For example, the laminations can be silica steel, common grades of cold-rolled steel, or alloys containing nickel, cobalt, copper, manganese, and/or carbon. A skew angle 114 can be between 10 and 45 degrees or between 5 and 50 degrees relative to the vertical, while wider ranges are contemplated. The rotor 110 is at least partially encased within the rotor cover 134 such that the laminations 112 are housed within the rotor cover 134. The interior surface 150 includes at least one opening 152, exposing the rotor 110 the stator 120.

In operation, electrical charging of the windings 180 generates an electromagnetic field which causes the rotor 110 to rotate freely about the stator 120. The rotor 110 is encased in the rotor cover 134 which includes the set of blade mounts 132 and attached set of blades 30; thus, rotation of the rotor 110 results in the rotation of the set of blades 30 and movement of the air in the area of the ceiling fan 10.

Integrally forming the blade mounts with the rotor case reduces the number of parts needed for assembly and also simplifies the existing parts by eliminating the need for separate blade irons. Such a reduction in parts reduces cost and overall complexity. Further, the need for fasteners to attach the blade iron to the motor is eliminated, further reducing cost and complexity. The need for threaded holes in upper cover and lower cover for blade iron attachment is also eliminated. Such a system as described herein provides for a simpler design, improving user installation experience, and is also more cost effective. Additionally, smaller fan sizes are made possible by integrally forming the blade mounts with the rotor cover.

Figure 4:
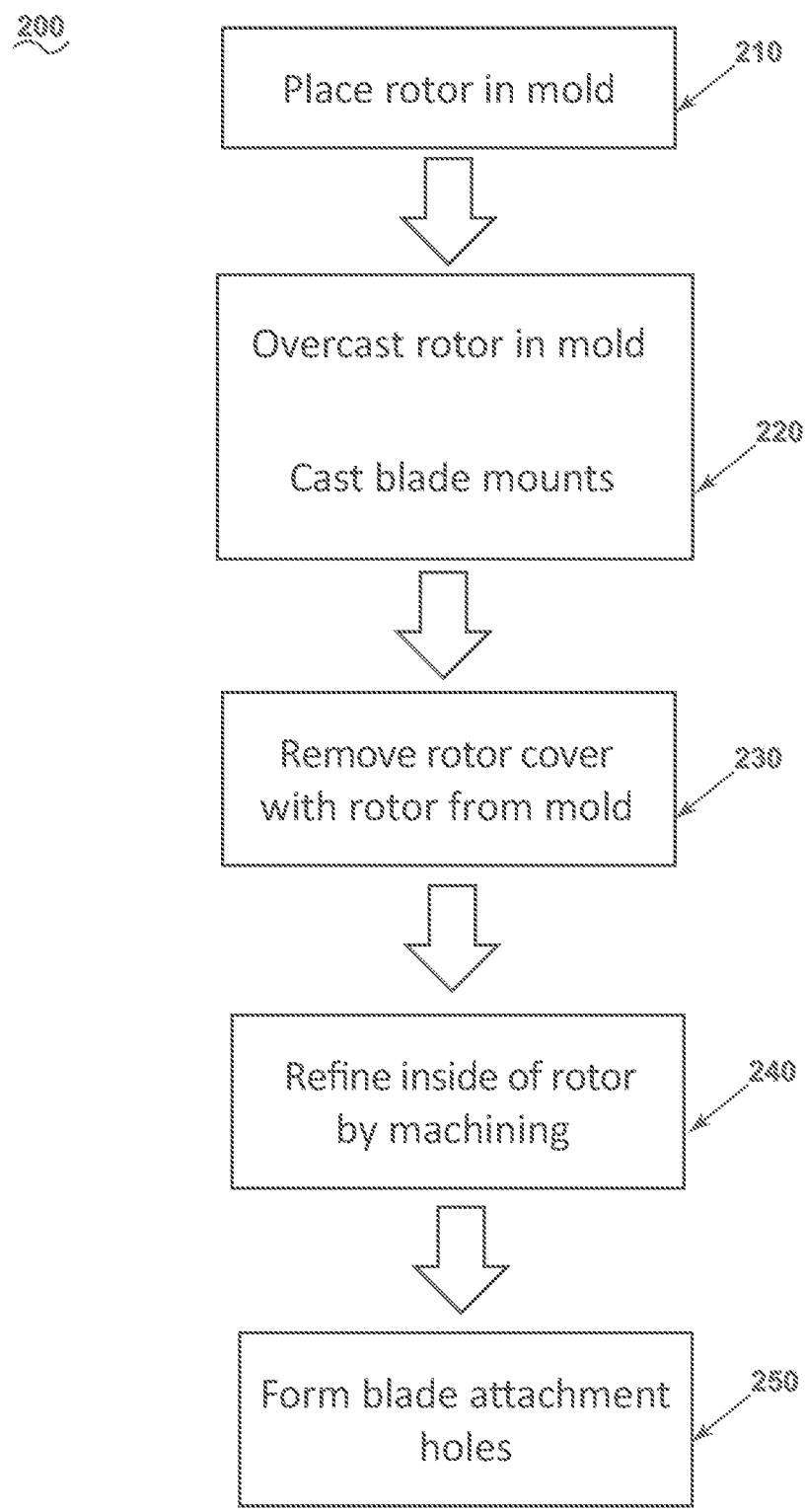
FIG. 4 is a flowchart for a method of forming a rotor cover for the motor assembly of FIG. 1.

A method 200 of forming the rotor cover 134 can proceed as shown in FIG. 4. At 210, the rotor 110 is placed in a mold. At 220, a straight pull rotor overcasting procedure is then used to form the rotor cover 134 based on the mold. In one example, the mold is two halves. Aluminum fills the spaces between the laminations 112 during the casting. Additionally, at 220, the blade mounts 132 can be cast directly onto the rotor cover 134, and can utilize extraneous material during the overcasting procedure. In this way, the blade mounts 132 and rotor cover 134 can be cast together in a single step, which reduces manufacturing costs and overall parts for the ceiling fan. Alternative attachment methods for the blade mounts 132 are contemplated, such as welding in one non-limiting example. In another non-limiting example, two to six blade mounts 132 can be formed on the rotor cover 134, while any number of blades or blade mounts 132 is contemplated. Additionally, and alternatively, blade mounts 132 can be formed on the rotor cover 134 using a standard multiple slide tooling procedure known in the art.

At 230, the rotor cover 134, along with rotor 110 contained therein, are removed from the mold. In one example, the set of blade mounts 132 do not circumferentially overlap, permitting the two mold halves to be directly pulled apart once the overcasting is complete. At 240, the inside of the rotor can be refined by a machine process to remove any excess casting material. Removal of the material can be part of defining or forming the air gap between the rotor 110 and the stator 120. The concentricity of the laminations 112 is improved by this machine process.

At 250, the blade attachment holes 138 can be formed by a standard drilling and tapping method in one non-limiting example, or by other methods known in the art.

The assembly of the ceiling fan 10 is simplified by the inclusion of the blade mounts 132 in the rotor cover 134 by overcasting. Because there are no blade irons required, and because the rotor 110 is overcast, there are fewer pieces to assemble and fewer fasteners required. By using an overcast rotor, the overall diameter of the motor case can be reduced. Further, assembly of the ceiling fan using an overcast requires a reduced number of steps for attachment of the end bells.

To the extent not already described, the different features and structures of the various features can be used in combination as desired. That one feature is not illustrated in all of the aspects of the disclosure is not meant to be construed that it cannot be, but is done for brevity of description. Thus, the various features of the different aspects described herein can be mixed and matched as desired to form new features or aspects thereof, whether or not the new aspects or features are expressly described. All combinations or permutations of features described herein are covered by this disclosure.

This written description uses examples to detail the aspects described herein, including the best mode, and to enable any person skilled in the art to practice the aspects described herein, including making and using any devices or systems and performing any incorporated methods. The patentable scope of the aspects described herein are defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are defined by the following clauses:

A ceiling fan comprising: a stator comprising a set of circumferentially spaced stator windings, a rotor and comprising a set of rotor laminations circumscribing the stator windings and a rotor cover overcast onto the rotor laminations, with the rotor cover including a set of blade mounts; and a set of blades carried by the set of blade mounts.

The ceiling fan of any preceding clause wherein a portion of the set of rotor laminations facing the stator windings is not covered by the rotor cover.

The ceiling fan of any preceding clause further comprising a first end bell mounted to the rotor cover and overlying the stator windings.

The ceiling fan of any preceding clause further comprising a second end bell mounted to the rotor, opposite the first end bell, and overlying the stator windings.

The ceiling fan of any preceding clause further comprising a stationary motor shaft extending through at least the stator and the first end bell.

The ceiling fan of any preceding clause further comprising a first bearing coupling the first end bell to the motor shaft.

The ceiling fan of any preceding clause wherein the blade mounts extend from an outer surface of the rotor cover.

The ceiling fan of any preceding clause wherein the blade mounts are circumferentially spaced.

The ceiling fan of any preceding clause wherein the rotor is rotatable about a rotational axis and the blade mounts are oriented at an angle relative to a line perpendicular to the rotational axis.

The ceiling fan of any preceding clause wherein the blade mounts are ramps.

The ceiling fan of any preceding clause wherein the rotor cover is at least partially made of aluminum.

The ceiling fan of any preceding clause wherein the rotor laminations are at least partially made of steel.

A ceiling fan comprising: a stator comprising circumferentially spaced stator windings, a rotor and comprising rotor laminations circumscribing the stator windings and a rotor cover formed as an overcasting onto the rotor laminations, except for a portion of the rotor laminations facing the stator windings, with the overcasting including a set of ramps, a plurality of blades, with each of the plurality of blades mounted to a different ramp, a first end bell mounted to an upper end of the rotor cover; a stationary motor shaft extending through the stator and the first end bell, and a bearing mounting the first end bell to the motor shaft.

The ceiling fan of any preceding clause wherein the overcasting comprises a set of mounting posts extending from at least the upper end and the first end bell is fastened to the mounting posts.

The ceiling fan of any preceding clause wherein the mounting posts are tapped.

The ceiling fan of any preceding clause wherein the wherein the rotor is rotatable about a rotational axis and the ramps are oriented at an angle relative to a line perpendicular to the rotational axis.

The ceiling fan of any preceding clause wherein the laminations are skewed relative to the rotational axis.

The ceiling fan of any preceding clause wherein the rotor cover is at least partially made of aluminum.

The ceiling fan of any preceding clause wherein the rotor laminations are at least partially made of steel.

The ceiling fan of any preceding clause wherein the blades are directly mounted to the ramps without an intervening blade iron.

A method of moving air about a space with a ceiling fan having a motor, with a rotor and stator, for driving a set of blades for moving the air about the space, the method comprising: rotating a rotor cover containing a set of rotor laminations, wherein the rotor cover includes a set of blade mounts for coupling the motor to the set of blades.

The method of any preceding clause further comprising rotating an upper cover, and a lower cover spaced from the upper cover by the rotor cover.

The method of any preceding clause wherein the rotor cover includes a set of openings exposing the set of rotor laminations to the stator.

The method of any preceding clause further comprising spacing the upper cover and the lower cover from a motor shaft mounting the stator.

What is claimed is:

1. A ceiling fan comprising:
    a stationary motor shaft having a longitudinal axis that defines a motor rotational axis;
    a stator comprising a set of circumferentially spaced stator windings, which circumscribe the stationary motor shaft;
    a rotor comprising:
        a set of rotor laminations circumscribing the stator windings,
        a rotor cover overcast onto the rotor laminations, with the rotor cover defining a peripheral wall having a radial exterior surface radially spaced from the rotational axis and terminating in axially-spaced, upper and lower rims, and
        a set of blade mounts extending from the radial exterior surface; and
    a set of blades carried by the set of blade mounts.

2. The ceiling fan of claim 1 wherein a portion of the set of rotor laminations facing the stator windings is not covered by the rotor cover.

3. The ceiling fan of claim 2 further comprising a first end bell mounted to the rotor cover and overlying the stator windings.

4. The ceiling fan of claim 3 further comprising a second end bell mounted to the rotor, opposite the first end bell, and overlying the stator windings.

5. The ceiling fan of claim 4 further comprising a stationary motor shaft extending through at least the stator and the first end bell.

6. The ceiling fan of claim 5 further comprising a first bearing coupling the first end bell to the motor shaft.

7. The ceiling fan of claim 1 wherein the blade mounts extend from an outer surface of the rotor cover.

8. The ceiling fan of claim 7 wherein the blade mounts are circumferentially spaced.

9. The ceiling fan of claim 7 wherein the rotor is rotatable about a rotational axis and the blade mounts are oriented at an angle relative to a line perpendicular to the rotational axis.

10. The ceiling fan of claim 7 wherein the blade mounts are ramps.

11. The ceiling fan of claim 1 wherein the rotor cover is at least partially made of aluminum.

12. The ceiling fan of claim 11 wherein the rotor laminations are at least partially made of steel.

13. A ceiling fan comprising:
    a stationary motor shaft having a longitudinal axis that defines a motor rotational axis;
    a stator comprising circumferentially spaced stator windings, which circumscribe the stationary motor shaft;
    a rotor comprising:
        rotor laminations circumscribing the stator windings,
        a rotor cover formed as an overcasting onto the rotor laminations, with the overcasting forming a radial exterior surface radially spaced from the rotational axis, with the radial exterior surface bounding and opposing upper and lower rims of the rotor cover, except for a portion of the rotor laminations facing the stator windings, and
        a set of ramps extending from the radial exterior surface;
    a plurality of blades, with each of the plurality of blades mounted to a different ramp;
    a first end bell mounted to the rotor cover and overlying the upper rim; and
    a bearing mounting the first end bell to the motor shaft.

14. The ceiling fan of claim 13 wherein the overcasting comprises a set of mounting posts extending from at least the upper end and the first end bell is fastened to the mounting posts.

15. The ceiling fan of claim 14 wherein the mounting posts are tapped.

16. The ceiling fan of claim 13 wherein the rotor is rotatable about a rotational axis and the ramps are oriented at an angle relative to a line perpendicular to the rotational axis.

17. The ceiling fan of claim 16 wherein the laminations are skewed relative to the rotational axis.

18. The ceiling fan of claim 17 wherein the rotor laminations are at least partially made of steel.

19. The ceiling fan of claim 13 wherein the rotor cover is at least partially made of aluminum.

20. The ceiling fan of claim 13 wherein the blades are directly mounted to the ramps without an intervening blade iron.

21. A ceiling fan comprising:
    a stator comprising a set of circumferentially spaced stator windings;
    a rotor comprising a set of rotor laminations circumscribing the stator windings;
    a rotor cover overcast onto the rotor laminations, with the rotor cover defining a radial exterior surface defining upper and lower rims, and having a set of blade mounts extending from the radial exterior surface; and
    a set of blades carried by the set of blade mounts.

22. A ceiling fan comprising:
a stator comprising a set of circumferentially spaced stator windings;
a stationary motor shaft coupled to the stator;
a rotor comprising a set of rotor laminations circumscribing the stator windings;
a rotor cover overcast onto the rotor laminations, with the rotor cover defining a radial exterior surface circumscribing the laminations and defining upper and lower rims, and having a set of blade mounts extending from the radial exterior surface;
an upper cover axially overlying the stator windings and secured to the rotor cover; and
a set of blades carried by the set of blade mounts.

* * * * *